United States Patent
Jorgensen

(10) Patent No.: US 9,838,222 B2
(45) Date of Patent: Dec. 5, 2017

(54) COUNTER UPDATE REMOTE PROCESSING

(71) Applicant: Hewlett-Packard Development Company, L.P., Houston, TX (US)

(72) Inventor: Steven Glen Jorgensen, Newcastle, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 657 days.

(21) Appl. No.: 13/917,350

(22) Filed: Jun. 13, 2013

(65) Prior Publication Data

US 2014/0372628 A1  Dec. 18, 2014

(51) Int. Cl.
*G06F 15/16* (2006.01)
*H04L 12/64* (2006.01)
*G06F 11/00* (2006.01)
*H04L 12/00* (2006.01)

(52) U.S. Cl.
CPC .......... *H04L 12/6418* (2013.01); *G06F 11/00* (2013.01); *H04L 12/00* (2013.01)

(58) Field of Classification Search
CPC ............................... H04L 49/25; H04L 45/22
USPC ......................................................... 709/245
See application file for complete search history.

(56) References Cited

U.S. PATENT DOCUMENTS

| | | | |
|---|---|---|---|
| 7,317,718 B1 * | 1/2008 | Kuo | H04L 49/30 370/360 |
| 7,710,952 B1 | 5/2010 | Kuo et al. | |
| 8,136,124 B2 | 3/2012 | Kosche et al. | |
| 8,923,124 B1 * | 12/2014 | Carney | H03K 21/38 370/235 |
| 2006/0265526 A1 * | 11/2006 | Holbrook | H04L 49/90 710/52 |
| 2011/0170539 A1 * | 7/2011 | Beheydt | H04N 21/4344 370/389 |
| 2011/0173366 A1 | 7/2011 | Satterfield et al. | |

OTHER PUBLICATIONS

Shah et al., "Maintaining Statistics Counters in Router Line Cards," Stanford University, IEEE, Jan. 25, 2002.

* cited by examiner

*Primary Examiner* — Wing F Chan
*Assistant Examiner* — Andrew Woo
(74) *Attorney, Agent, or Firm* — Mannava & Kang, P.C.

(57) ABSTRACT

According to an example, a counter update determination module may receive a counter address for a local counter and map the counter address to a specific forwarding mode of a plurality of forwarding modes. In addition, a remote processing module may receive a posted value associated with the local counter. The remote processing module may include a plurality of forwarding engines respectively associated with a mapped forwarding mode. A forwarding engine of the plurality of forwarding engines may be selected based on the mapped forwarding mode, and the selected forwarding engine may forward the posted value to a remote device for remote processing.

13 Claims, 6 Drawing Sheets

| | | | | |
|---|---|---|---|---|
| | | REMOTE DEVICE FORWARDING TABLE | | |
| | COUNTER NO. | COUNTER (C) ADDRESS | SEND TO REMOTE DEVICE? | FORWARDING MODE |
| | 1 | C1 ADDRESS | Y | PACKETIZE |
| | 2 | C2 ADDRESS | Y | PACKETIZE |
| | 3 | C3 ADDRESS | N | PACKETIZE |
| | 4 | C4 ADDRESS | N | DEDICATED INTERFACE |
| | N | CN ADDRESS | Y/N | OTHER MODES |

Fig. 3

COUNTER UPDATE REMOTE PROCESSING

BACKGROUND

An application specific integrated circuit (ASIC) is an integrated circuit (IC) that is typically customized for a particular use. ASICs generally include counters that count events associated with the particular use. Due to the size limitations of ASICs and the number of counters that can be supported by a given ASIC, count values stored in the ASIC counters (e.g., 32 bit or smaller counters) are polled by software to update one or more larger counters (e.g., 64 bit counters) in the central processing unit (CPU) main memory (i.e., the double data rate dynamic random-access memory (DDR DRAM)). For example, current count values stored in the ASIC counters are polled by software and then compared to the latest values in the DDR DRAM for the respective counters. Based on the difference between the latest values in the DDR DRAM and the current count values, the count values stored in the ASIC counters and DDR DRAM are updated. These counters in DDR DRAM may be polled by an external device using a communication protocol (e.g., a management information base (MIB))

BRIEF DESCRIPTION OF DRAWINGS

Features of the present disclosure are illustrated by way of example and not limited in the following figure(s), in which like numerals indicate like elements, in which:

FIG. 3 illustrates a remote device forwarding table used by the counter update remote processing apparatus, according to an example of the present disclosure;

DETAILED DESCRIPTION

Figure 1:
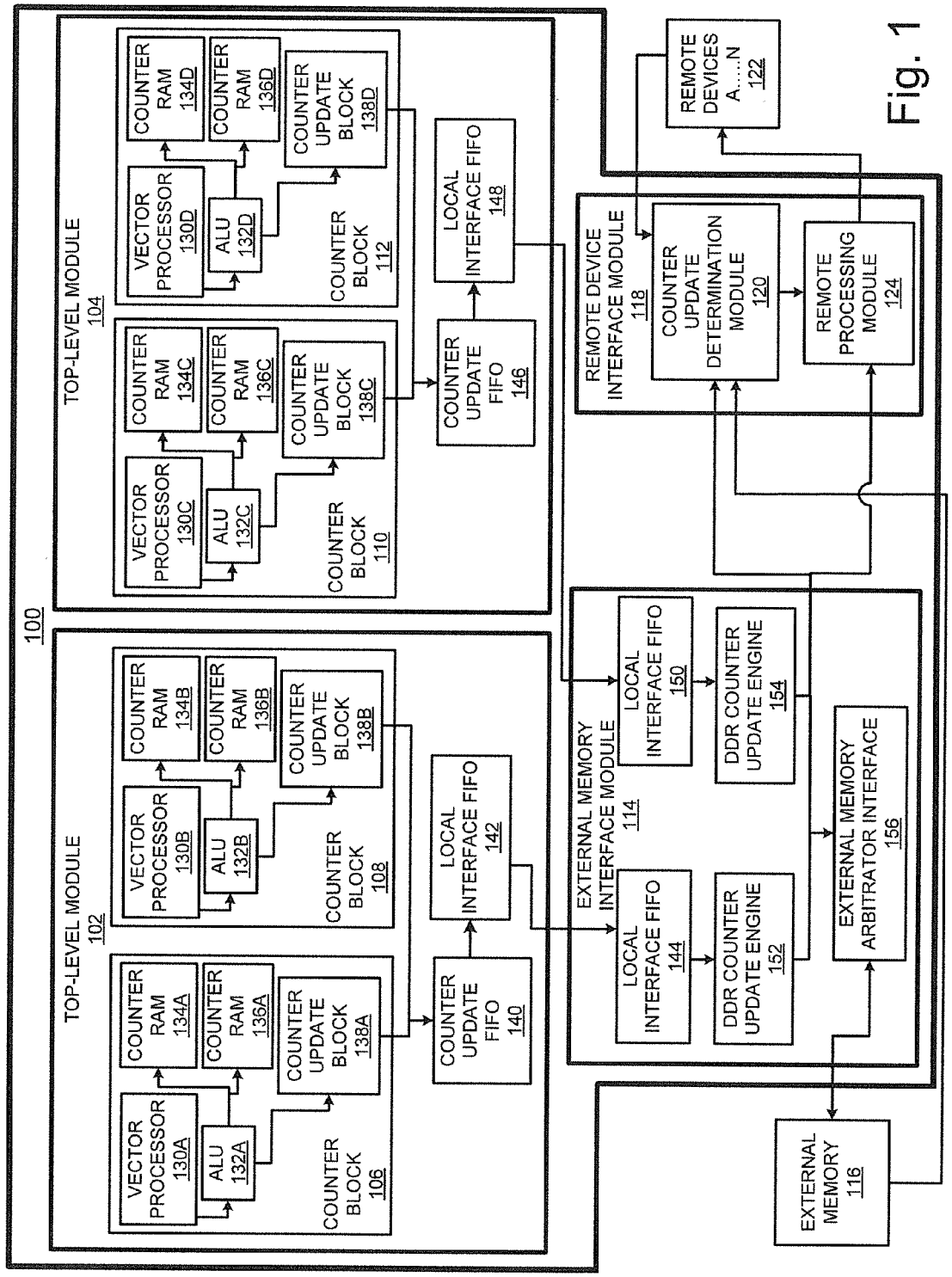
FIG. 1 illustrates an architecture of a counter update remote processing apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In an ASIC that includes counters that count events, use of count values based on local counters being polled by software that also processes the polled count values to determine overall count values for counters in external memory can add, for example, unnecessary delay in the use of such polled count values, and unnecessary resource utilization. The need for software to poll local counters and the associated delay and resource utilization aspects may be eliminated by a counter update remote processing apparatus, and a method for counter update remote processing, as described herein. According to an example, the counter update remote processing apparatus may include a counter update determination module to receive a counter address for a local counter and map the counter address to a specific forwarding mode of a plurality of forwarding modes. In addition, a remote processing module may receive a posted value associated with the local counter. The remote processing module may include a plurality of forwarding engines respectively associated with a mapped forwarding mode. A forwarding engine of the plurality of forwarding engines may be selected based on the mapped forwarding mode, and the selected forwarding engine may forward the posted value to a remote device for remote processing.

Based, for example, on the detection of a counter update post from a local counter for a counter in external memory, a counter update post may be forwarded to a remote device. This provides several benefits, such as two devices that count the same set of events and have the same counter update post at any given time. If a device that is local to events being counted does not have bulk storage, or has limited storage, the remote device may be provided with the needed storage to maintain the same counter update post at any given time. If the counter update post stored in the external memory is packetized and forwarded to the remote device, the remote device may be located anywhere in the world. The method and apparatus disclosed herein also eliminate the need and delay associated with unnecessary polling of local counters by software, the need for a remote device to unnecessarily request counter value updates, and the need for forwarding a local counter value unless these values have been actually updated. Moreover, the size of information packets transmitted to a remote device are also reduced based, for example, on packetizing and periodical forwarding of counter value updates that are posted to the external memory. This is because the post value may be physically smaller or because posts that are transmitted are limited to counters that are changing. Further, based, for example, on the detection of a counter update post from a local counter for a counter in external memory, counters from a large number of smaller devices may be presented at a single remote location. For example, the updates to counters at a large number of smaller devices may be bundled and sent to a single remote location (e.g., for processing, analysis, etc.), while maintaining local counters for local purposes (e.g., limited analysis of events being monitored).

FIG. 1 illustrates an architecture of a counter update remote processing apparatus 100, according to an example. Referring to FIG. 1, the apparatus 100 is depicted as including top-level modules 102, 104 that include various components associated with internal (i.e., local) ASIC counters included in counter blocks 106, 108, 110, and 112. Although four counter blocks 106, 108, 110, and 112 are shown, those skilled in the art would appreciate in view of this disclosure that the number of counter blocks may vary depending on aspects such as a number of events to be monitored by the apparatus 100. Counter updates to the internal ASIC counters may be received by external memory interface module 114 that posts the counter updates to one or more larger counters in external memory 116. Counter updates that are to be posted to the larger counters in the external memory 116 may be detected by a remote device interface module 118. Generally, the remote device interface module 118 may include a counter update determination module 120 to determine, based on a counter update post, information related to the particular internal ASIC counter associated with the counter update post. Further, the counter update determination module 120 may determine, based on the information related to the particular internal ASIC counter, if the counter update post is to be forwarded to a remote device 122 and/or to a plurality of remote devices A-N 122. The remote device interface module 118 may further include a remote processing module 124 to use, based on the information related to the particular internal ASIC counter, a mode of forwarding the counter update post to the remote device 122 for remote processing.

The modules 102, 104, 114, 118, 120, and 124, and other components of the apparatus 100 that perform various other functions in the apparatus 100, may be hardware components, such as various circuit components. In addition, or alternatively, the modules 102, 104, 114, 118, 120, and 124, and other components of the apparatus 100 may be machine readable instructions stored on a non-transitory computer readable medium, or a combination of machine readable instructions and hardware components.

Referring to FIG. 1, the top-level modules 102, 104 may include various components associated with internal ASIC counters included in counter blocks 106, 108, 110, and 112. The counter blocks 106, 108, 110, and 112 may each include a unique identification (ID) associated therewith. The configuration of each of the counter blocks 106, 108, 110, and 112 may generally be identical, and each of the counter blocks 106, 108, 110, and 112 may include an internal ASIC counter (e.g., 32 bit ASIC counter).

For example, the counter block 106 may include a vector processor 130A to receive a vector that may be generated upon the occurrence of an event being monitored by the counter block 106. The vector processor 130A, via the arithmetic and logic unit (ALU) 132A, may update the counter RAMs 134A and 136A, each representing an internal ASIC counter used to count events being monitored by the counter block 106. The use of two counter RAMs 134A and 136A per update may provide an optimization based on the large amounts of data monitored by the counter block 106. Alternatively, a single counter RAM may be used instead. The ALU 132A may perform a read, modify, and write operation on the counter RAMs 134A and 136A. The ALU 132A may process updates (i.e., incoming events) and flushing of the internal ASIC counters.

If an internal ASIC counter reaches or exceeds a predetermined count value (i.e., a count threshold) specified for the particular internal ASIC counter, the count value may be posted to counter update block 138A. For example, once the ALU 132A detects that counter RAMs 134A or 136A have met or exceeded a predetermined count value, the ALU 132A may post the count value to the counter update block 138A, and flush the counter RAMs 134A and 136A by writing a zero back to the counter RAMs 134A and 136A. If the ALU 132A detects that a counter RAM is nearly full after a read-modify-write action, the modified value for the particular counter RAM is forwarded to storage for a counter update. The counter update block 138A may communicate with the ALU 132A to determine if the counter update block 138A has sufficient room to store an update. The posted count values from the counter update blocks 138A and 138B (i.e., counter block 108) may be forwarded to a counter update FIFO (first in first out) 140. The counter update FIFO 140 may forward the posted count value to a local interface FIFO 142 for the top-level module 102. The local interface FIFO 142 communicates with local interface FIFO 144 for the external memory interface module 114. Counter blocks 108, 110, and 112 include components similar to counter block 106, and are therefore designated in a similar manner as shown in FIG. 1. For example, the vector processor 130A for counter block 106 is similarly designated as vector processors 130B, 130C, and 130D, for counter blocks 108, 110, and 112, respectively. Top-level module 104 may include counter update FIFO 146 similar to counter update FIFO 140 of the top-level module 102, and local interface FIFO 148 similar to local interface FIFO 142 of the top-level module 102. The local interface FIFO 148 of the top-level module 104 communicates with local interface FIFO 150 for the external memory interface module 114. The discussion below related to counter block 106 therefore similarly applies to counter blocks 108, 110, and 112.

As discussed herein, the ALU 132A may perform a read, modify, and write operation on the counter RAMs 134A and 136A. If the ALU 132A determines that the counters RAM 134A and 136A may wrap after being modified, the ALU 132A forwards a modified value for counter RAMs 134A and 136A and an offset, to the counter update block 138A. If the counter update block 138A includes sufficient space, the ALU 132A writes zero to the counter RAMs 134A and 136A, and if the counter update block 138A is full, the ALU 132A writes the modified value back to the counter RAMs 134A and 136A, and re-attempts the process upon occurrence of the next transaction to the counter RAMs 134A and 136A.

As discussed herein, if an internal ASIC counter meets or exceeds (i.e., based on the configuration of the ALU 132A) a predetermined count value (i.e., a count threshold) specified for the particular internal ASIC counter, the count value may be posted to counter update block 138A. For example, once the ALU 132A detects that counter RAMs 134A and 136A have exceeded a predetermined count value, the ALU 132A may post the count value to the counter update block 138A, and the ALU 132A may further flush the counter RAMs 134A and 136A by writing a zero back to the counter RAMs 134A and 136A. However, for low traffic conditions, if a count value for an internal ASIC counter remains below a predetermined count value, which prevents the external memory 116 from being updated for an extended period, a forced flush may be initiated on the counter RAMs 134A, 136A. For example, based on expiration of a predetermined period of time, if a count value for an internal ASIC counter remains below a predetermined count value, a forced flush may be initiated on the counter RAMs 134A, 136A. A state machine may be used to scan each counter RAM 134A, 136A, and if the count value stored in the counter RAMs 134A and 136A is non-zero, the non-zero count value may be transferred to the counter update block 138A if the counter update block 138A is available. If the counter update block 138A is not available, the state machine may re-try the flush operation for the counter block 106.

The counter blocks 106, 108, 110, and 112 may maintain a set of dirty bits representing a segment of counter space. The dirty bits may be used to determine which counters have been updated. For example, when a counter is updated, the dirty bit representing that segment of counter space is set. When a counter is flushed, the dirty bit representing that segment of counter space is latched and the internal bits are cleared to be set by counter updates during a flush period. The latched bits may be presented to a register read interface, and may be used by a flush state machine to determine which segments to flush. The latched bits may also be used to determine which counters have been updated.

With respect to the external memory interface module 114, any counter value updates received by the local interface FIFO 144 or the local interface FIFO 150 may be forwarded to DDR counter update engines 152, 154, respectively. Data received by the local interface FIFOs 144, 150 may include, for example, 2 bits for ALU operation type, 6 reserved bits, 8 bits for counter ID, 16 bits for counter offset, 24 bits upper counter data (i.e., counter RAM 134A for counter block 106), and 24 bits lower counter data (i.e., counter RAM 136A for counter block 106). The DDR counter update engines 152, 154 may determine aspects such as which of the counters from the top-level modules 102, 104 are associated with the counter value update.

Based on the determination by the DDR counter update engines 152, 154, the counter value update may be mapped to the appropriate memory location in the external memory 116. External memory arbitrator interface 156 may provide the DDR interface for posting the counter value update to the appropriate counter (e.g., 64 bit counter) and memory location in the external memory 116. For example, information from the local interface FIFOs 144, 150 may be used in a read-modify-write operation for two associated counters in the external memory 116. Thus, any counter value in the external memory 116 includes the sum of all counter value updates from the top-level modules 102, 104 that are posted to the appropriate counter and memory location in the external memory 116. As discussed herein, a value of zero is also returned to any counter associated with the counter value update to the top-level modules 102, 104 to reset the appropriate counter in the top-level modules 102, 104. Any counter value in the external memory 116 therefore includes the sum of all events that have occurred (e.g., the sum of all updates received by a particular counter in the top-level modules 102, 104) and are associated with a particular counter in the top-level modules 102, 104.

Figure 2:
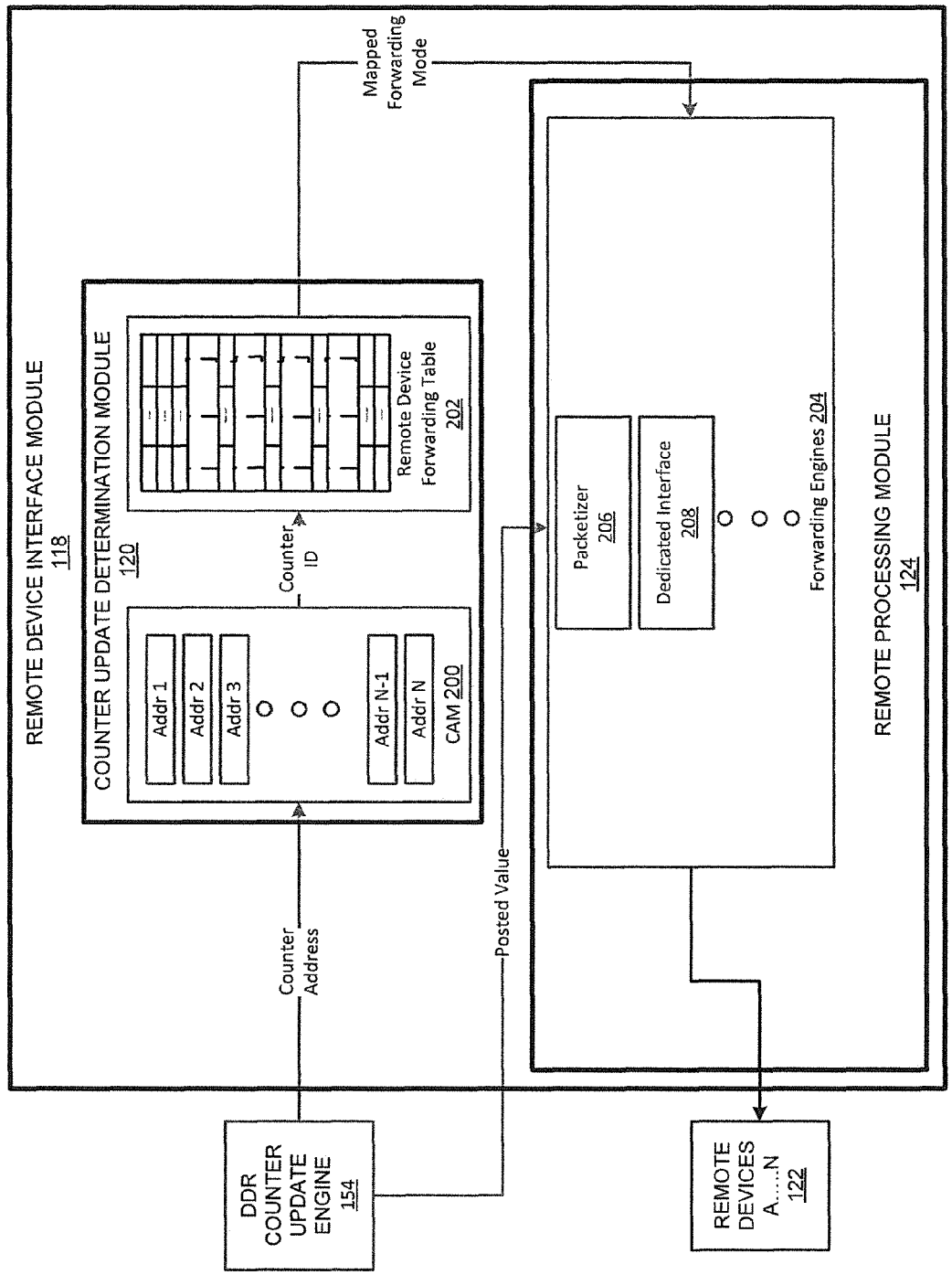
FIG. 2 illustrates further details of a remote device interface module of the counter update remote processing apparatus, according to an example of the present disclosure.

As discussed herein, the DDR counter update engines 152, 154 may determine aspects such as which of the counters from the top-level modules 102, 104 are associated with a counter value update. Referring to FIGS. 1 and 2, FIG. 2 illustrates further details of an architecture of the remote device interface module 118, according to an example of the present disclosure. The remote device interface module 118 may receive a full counter address from the DDR counter update engine 154 (or the DDR counter update engine 152 as shown in FIG. 1) for a local counter of the top-level modules 102, 104 that is associated with the counter value update. The counter update determination module 120 may use a content-addressable memory (CAM) (e.g., a lookup table, or a hash table) to map the counter address to a specific forwarding mode of a remote device forwarding table 202. The remote device forwarding table 202 may be located on the ASIC as shown in FIG. 1, or in the external memory 116. As illustrated in further detail in FIG. 3, the remote device forwarding table 202 may include a counter number column 302, a counter address column 304, a send to remote device column 306, and a forwarding mode column 308.

The counter address column 304 may include, for example, the unique ID associated with the counter blocks 106, 108, 110, and 112. The send to remote device column 306 may include an indication 310 of whether the counter update post is to be forwarded to the remote device 122. The send to remote device column 306 may also include indications (not shown) of when to forward the counter update post to the remote device 122. For example, the send to remote device column 306 may include indications of forwarding the counter update post to the remote device 122 after a predetermined time delay or at predetermined intervals based on the requirements of the remote device 122.

The forwarding mode column 308 may include modes 312 of forwarding the counter update post to the remote device 122 for remote processing. For example, the forwarding mode column 308 may include modes 312, such as, packetizing, forwarding via a dedicated interface 208, etc., the counter update post to the remote device 122 for remote processing. For the packetizing forwarding mode, a plurality of counter update posts may be packetized and forwarded to the remote device 122 for remote processing. Therefore, the remote device interface module 118 may use the remote device forwarding table 202 to determine, based on the information related to a local counter, if the counter update post is to be forwarded to the remote device 122.

The remote processing module 124 may use the remote device forwarding table 202 to assign, based on the information related to a local counter, a mode of forwarding (i.e., a forwarding engine) the counter update post to the remote device 122 for remote processing. For example, the remote processing module 124 may include a plurality of forwarding engines 204 that are used to forward the counter update post to the remote device 122. For example, the remote processing module 124 may include a packetizer 206, or a forwarding engine to forward via the dedicated interface 208, etc., the counter update post to the remote device 122 for remote processing. Generally, the remote processing module 124 may receive counter updates from a plurality of devices including top-level modules, and based on an evaluation of the counter updates, forward the counter update posts to the remote device 122 and/or to the plurality of remote devices A-N 122.

Once the remote device 122 receives the counter update post, the counter update post may therefore be maintained by the external memory 116 and the remote device 122. The remote device 122 may be disposed physically in another location from the counter update remote processing apparatus 100 without access to the external memory 116 (e.g., the remote device 122 may include its own memory/storage). Thus, the remote processing module 124 may forward the counter update post for the external memory 116 to the remote device 122 for remote processing. The remote processing module 124 may forward the counter update post for a particular counter, or a sub-set of the counters that are monitored by the remote device interface module 118. Moreover, the remote processing module 124 may forward the counter update posts from one or more of the counter blocks 106, 108, 110, and 112, to one or more of the associated remote devices 122. The post to the counter update determination module 120 and to the external memory 116 may be parallel as shown in FIG. 1. Further, the counter update determination module 120 may not have access to the full counter value. Instead, the counter update determination module 120 may access the posts from the DDR counter update engines 152, 154, and the external memory arbitrator interface 156.

Forwarding of the counter update post to the remote device 122 when a counter update is to be posted to the external memory 116 may provide several benefits. For example, once a counter update is to be posted to the external memory 116, forwarding of the counter update post to the remote device 122 provides two devices that have a count of the same set of events, and have the same counter update post. One of the two devices may be local (e.g., the device including the apparatus 100), and the other device may be disposed remotely (e.g., the remote device 122). If the counter update post is packetized and forwarded to the remote device 122, the remote device 122 may be located anywhere in the world. If instead of automatically forwarding of the counter update post to the remote device 122 when a counter update is to be posted to the external memory 116, a remote device were to periodically request the value of the counter, the delay in receiving a request from such a remote device, and the further delay in forwarding the counter value to the same remote device may be considered unacceptable. Moreover, in situations where no updates are posted to a counter for an extended period of time, such periodic requests from a remote device that are received when no updates are posted to a counter for an extended period of time may unnecessarily consume valuable recourses.

According to another example, in a device that may include hundreds of thousands of local ASIC counters (e.g., 300,000 counters), if a remote device needs information related to relatively few local ASIC counters (e.g., 10 counters), the remote device may request information related to the relevant counters. The local ASIC counters may be polled by software, and then compared to the latest values in the DDR DRAM for the respective counters. Based on the difference between the latest values in the DDR DRAM and the current count values, the count values stored in the ASIC counters and DDR DRAM may be updated. However, such polling by software, comparison, and update of count values stored in the ASIC counters and the DDR DRAM can consume valuable resources.

Instead, for the apparatus 100, the remote device forwarding table 202 may include a flag related to the specific local counters of interest by a remote device. Local counters that are of interest to a remote device may also be flagged in a table that maps the specific counter to an address in the external memory 116. Alternatively, a counter in the external memory 116 may include state information indicating if a counter value is to be sent to a remote device. If a counter update is to be posted to the external memory 116 for a flagged local counter, the counter update post may be forwarded to the remote device 122 when a counter update is to be posted to the external memory 116. Further, for the foregoing example of polling by software that is eliminated by the apparatus 100, such polling by software, comparison, and update of count values stored in the ASIC counters and the DDR DRAM can add delay to the forwarding of a local counter value or a value of a counter stored in the external memory 116 to a remote device. For example, if it takes an x-time period to poll all counters by software after receiving a request from a remote device, a y-time period to calculate a counter update value for the counter stored in the external memory 116, and a z-time period to send the requested information to a remote device, the information received by a remote device can have a delay of at least x+y time periods.

The apparatus 100 may thus eliminate the need for software to needlessly poll local counters, the need for the remote device 122 to unnecessarily request counter value updates, and the need for forwarding a local counter value or a value of a counter stored in the external memory 116 unless these values have been actually updated. The apparatus 100 may thus eliminate any delay caused by polling all counters after receiving a request from a remote device and determining a counter update value for the counter stored in the external memory 116. The apparatus 100 may also provide virtually instantaneous forwarding of the counter update post to the remote device 122. The apparatus 100 may further reduce the size of information packets transmitted to the remote device 122. For example, by packetizing and periodically forwarding counter value updates that are posted to the external memory 116, the size of such periodically sent packets may also be reduced compared to packets sent when a remote device requests information related to all counter value updates.

Referring back to FIG. 1, in order to limit the number of counter update posts that are forwarded to the remote device 122 when a counter update is to be posted to the external memory 116, a buffer may be used to store addresses for the particular local counter subject to the counter update post, and counter values of the local counter updates. The buffer may be provided with the remote processing module 124. When the buffer reaches a predetermined number of stored counter update posts, the addresses for the particular local counter subject to the counter update post and counter values of the local counter updates may be bundled and forwarded to the remote device 122 by the remote processing module 124.

Figure 4:
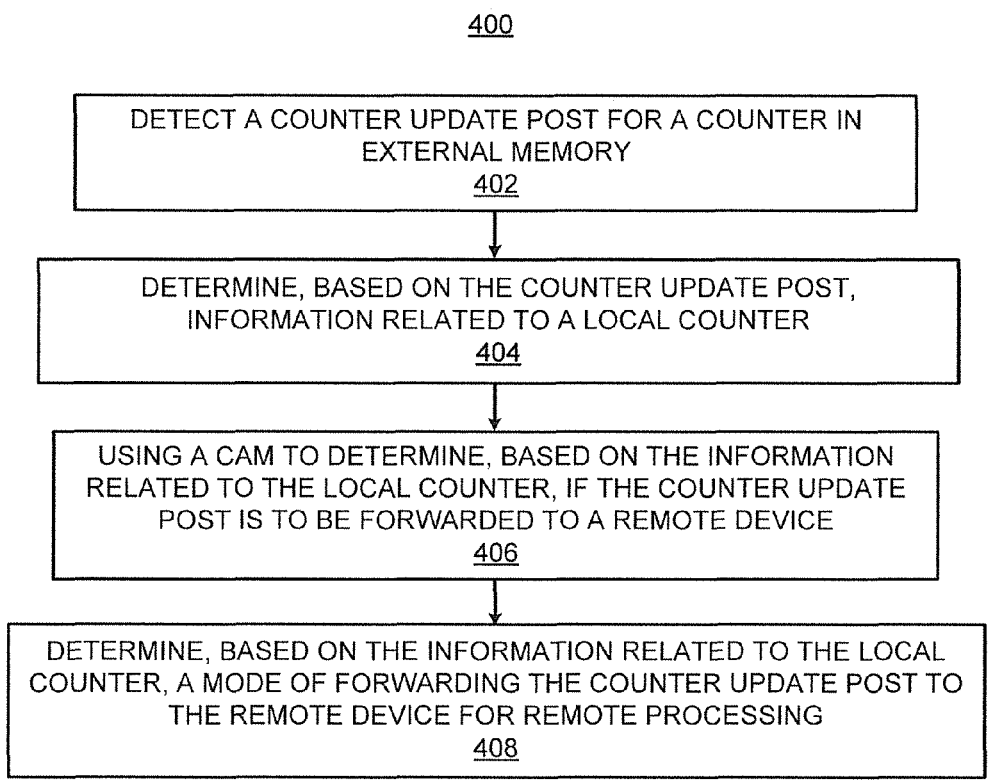
FIG. 4 illustrates a method for counter update remote processing, according to an example of the present disclosure.
Figure 5:
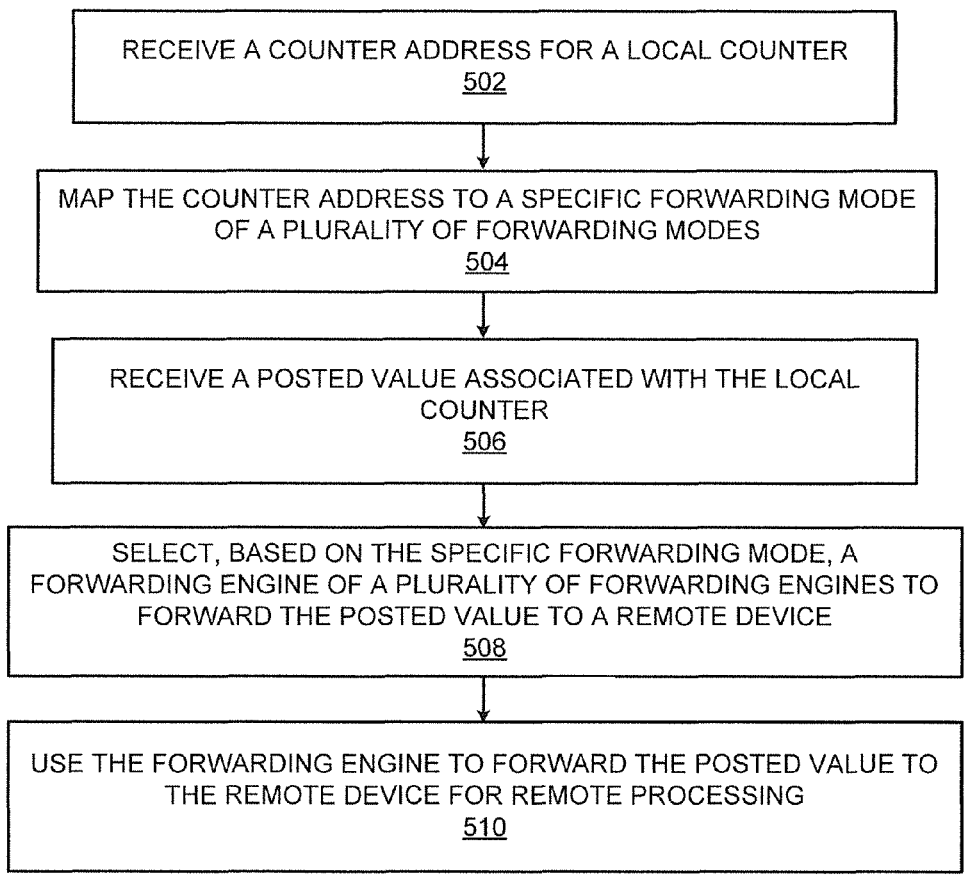
FIG. 5 illustrates further details of the method for counter update remote processing, according to an example of the present disclosure.

FIGS. 4 and 5 respectively illustrate flowcharts of methods 400 and 500 for counter update remote processing, corresponding to the example of the counter update remote processing apparatus 100 whose construction is described in detail above. The methods 400 and 500 may be implemented on the counter update remote processing apparatus 100 with reference to FIG. 1 by way of example and not limitation. The methods 400 and 500 may be practiced in other apparatus.

Referring to FIG. 4, for the method 400, at block 402, a counter update post for a counter in external memory may be detected. For example, referring to FIG. 1, the counter updates that are to be posted to counters in the external memory 116 may be detected by the remote device interface module 118.

At block 404, based on the counter update post, information related to a local counter may be determined. For example, referring to FIG. 1, the counter update determination module 120 may determine, based on a counter update post, information related to the particular internal ASIC counter associated with the counter update post.

At block 406, a CAM may be used to determine, based on the information related to the local counter, whether the counter update post is to be forwarded to a remote device. For example, referring to FIGS. 1 and 2, the counter update determination module 120 may use the CAM 200 to determine, based on the information related to the particular internal ASIC counter, if the counter update post is to be forwarded to the remote device 122. Also, referring to FIG. 3, the remote device forwarding table 202 may be used by the counter update determination module 120 to determine if the counter update post is to be forwarded to the remote device 122.

At block 408, based on the information related to the local counter, a mode of forwarding the counter update post to the remote device 122 for remote processing may be determined. For example, referring to FIGS. 1 and 2, the counter update determination module 120 may determine, based on the information related to the particular internal ASIC counter, a mode of forwarding the counter update post to the remote device 122 for remote processing. Referring to FIG. 3, the remote processing module 124 may assign a forwarding engine based on the forwarding mode determined by the counter update determination module 120.

Referring to FIG. 5, for the method 500, at block 502, a counter address for a local counter may be received. For example, referring to FIGS. 1 and 2, a counter address for a local counter may be received by the counter update determination module 120.

At block 504, the counter address may be mapped to a specific forwarding mode of a plurality of forwarding modes. For example, referring to FIGS. 1 and 2, the counter address may be mapped to a specific forwarding mode of a plurality of forwarding modes at 308 of the remote device forwarding table 202.

At block 506, a posted value associated with the local counter may be received. For example, referring to FIGS. 1 and 2, a posted value associated with the local counter may be received by the remote processing module 124.

At block 508, based on the specific forwarding mode, a forwarding engine of a plurality of forwarding engines may be selected to forward the posted value to a remote device. For example, referring to FIGS. 1 and 2, a forwarding engine of the forwarding engines 204 may be selected to forward the posted value to the remote device 122.

At block 510, the forwarding engine may be used to forward the posted value to the remote device for remote processing. For example, referring to FIGS. 1 and 2, the forwarding engine may be used to forward the posted value to the remote device 122 for remote processing.

Figure 6:
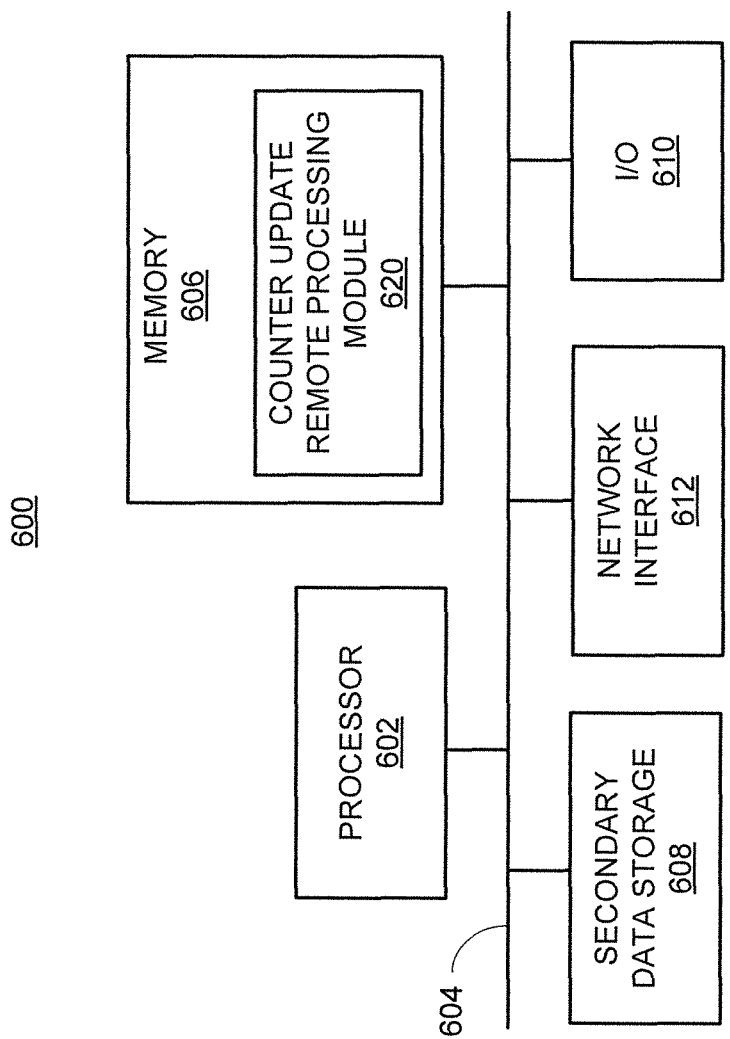
FIG. 6 illustrates a computer system, according to an example of the present disclosure.

FIG. 6 shows a computer system 600 that may be used with the examples described herein. The computer system represents a generic platform that includes components that may be in a server or another computer system. The computer system 600 may be used as a platform for the apparatus 100. The computer system 600 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 604. The computer system also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include a counter update remote processing module 620 including machine readable instructions residing in the memory 606 during runtime and executed by the processor 602. The counter update remote processing module 620 may include the modules 118, 120, and 124 of the apparatus shown in FIG. 1.

The computer system 600 may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A counter update remote processing apparatus comprising:
    a counter update determination circuit component to receive a counter address for a local counter, to receive information related to a plurality of forwarding modes from a remote device, and to map the counter address to a specific forwarding mode of the plurality of forwarding modes; and
    a remote processing circuit component to receive a posted value associated with the local counter, the remote processing circuit component including:
        a plurality of forwarding circuit components respectively associated with a mapped forwarding mode, wherein a forwarding circuit component of the plurality of forwarding circuit components is selected based on the mapped forwarding mode,
        wherein the counter update determination circuit component is to determine, based on the counter address, whether the posted value is to be forwarded to the remote device, and wherein the selected forwarding circuit component is to forward the posted value to the remote device for remote processing,
        wherein the plurality of forwarding circuit components includes a dedicated interface to forward the posted value to the remote device for remote processing.

2. The counter update remote processing apparatus of claim 1, wherein the counter update determination circuit component is to use a content-addressable memory (CAM) to map the counter address to the specific forwarding mode of the plurality of forwarding modes.

3. The counter update remote processing apparatus of claim 1, further comprising:
    a double data rate (DDR) counter update circuit component to forward the posted value associated with the local counter to the remote processing circuit component.

4. The counter update remote processing apparatus of claim 3, further comprising:
    a counter block circuit component that is to use an arithmetic logic unit (ALU) and a counter update first in first out (FIFO) to forward the posted value to the DDR counter update circuit component.

5. The counter update remote processing apparatus of claim 1, wherein the plurality forwarding circuit components includes a packetizer to packetize the posted value to the remote device for remote processing.

6. The counter update remote processing apparatus of claim 1,
    wherein the plurality of forwarding circuit components are to forward the posted value to the remote device for remote processing based on a protocol requested by the remote device.

7. A method for counter update remote processing, the method comprising:
    receiving a counter address for a local counter;
    receiving information related to a plurality of forwarding modes from a remote device;
    mapping the counter address to a specific forwarding mode of the plurality of forwarding modes;
    receiving a posted value associated with the local counter;

selecting, based on the specific forwarding mode, a forwarding engine of a plurality of forwarding engines to forward the posted value to the remote device;

determining, based on the counter address, whether the posted value is to be forwarded to the remote device; and using the forwarding engine to forward the posted value to the remote device for remote processing based on a protocol requested by the remote device.

8. A counter update remote processing apparatus comprising:

a counter update determination circuit component to receive a counter address for a local counter, to receive information related to a plurality of forwarding modes from a remote device, wherein the information related to the plurality of forwarding modes specifies a specific forwarding mode of the plurality of forwarding modes for the counter address, and to map the counter address to the specific forwarding mode based on the information; and a remote processing circuit component to receive a posted value associated with the local counter, the remote processing circuit component including:

a plurality of forwarding circuit components respectively associated with a mapped forwarding mode, wherein the plurality of forwarding circuit components includes a dedicated interface to forward the posted value to the remote device for remote processing, wherein a forwarding circuit component of the plurality of forwarding circuit components is selected based on the mapped forwarding mode, and wherein the selected forwarding circuit component is to forward the posted value to the remote device for remote processing through the dedicated interface, wherein the counter update determination circuit component is to determine, based on the counter address, whether the posted value is to be forwarded to the remote device.

9. The counter update remote processing apparatus of claim 8, wherein the counter update determination circuit component is to use a content-addressable memory (CAM) to map the counter address to the specific forwarding mode of the plurality of forwarding modes.

10. The counter update remote processing apparatus of claim 8, further comprising:

a double data rate (DDR) counter update circuit component to forward the posted value associated with the local counter to the remote processing circuit component.

11. The counter update remote processing apparatus of claim 10, further comprising:

a counter block circuit component that is to use an arithmetic logic unit (ALU) and a counter update first in first out (FIFO) to forward the posted value to the DDR counter update circuit component.

12. The counter update remote processing apparatus of claim 8, wherein the plurality forwarding circuit components includes a packetizer to packetize the posted value to the remote device for remote processing.

13. The counter update remote processing apparatus of claim 8, wherein the plurality of forwarding circuit components are to forward the posted value to the remote device for remote processing based on a protocol requested by the remote device.

* * * * *